June 16, 1953     P. W. DALRYMPLE     2,641,879
MOUNTING METHOD
Filed July 11, 1951     2 Sheets-Sheet 1
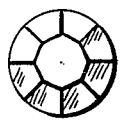
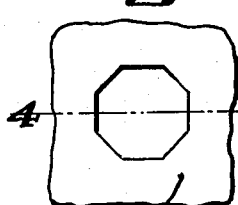
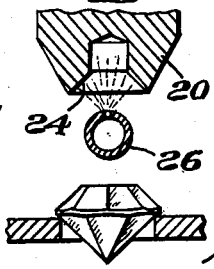
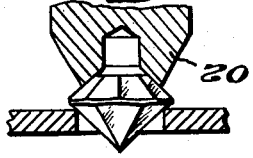
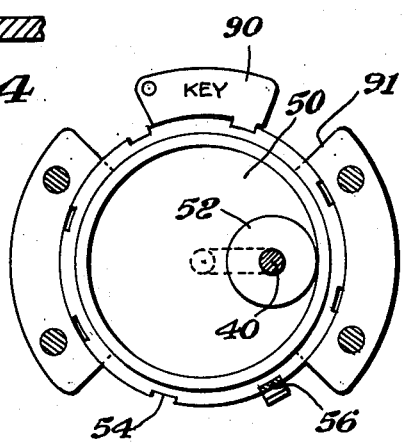
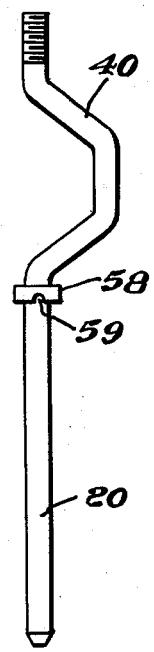
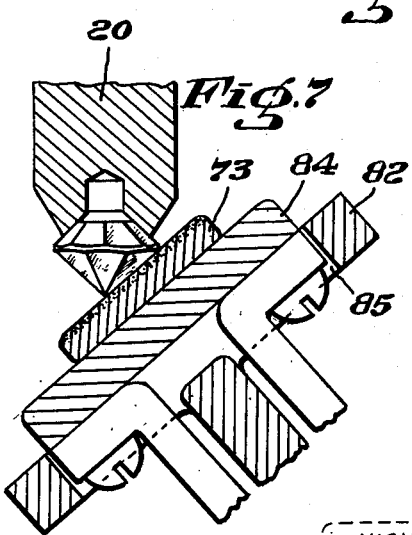
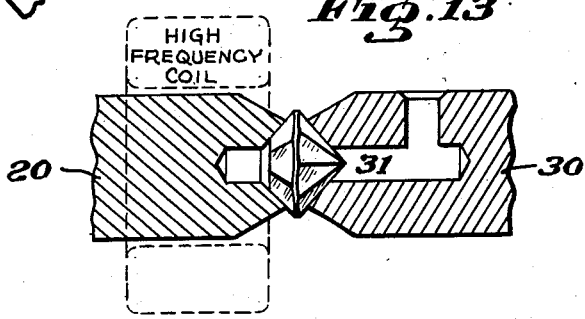
INVENTOR.
Philip W. Dalrymple
BY Rowland V. Patrick
ATTORNEY June 16, 1953  P. W. DALRYMPLE  2,641,879
MOUNTING METHOD
Filed July 11, 1951  2 Sheets-Sheet 2
*Fig.14*  *Fig.16*  *Fig.18*
  *Fig.15*  *Fig.17*  *Fig.19*
     
COARSE  FINE  POLISH  COARSE  FINE  POLISH
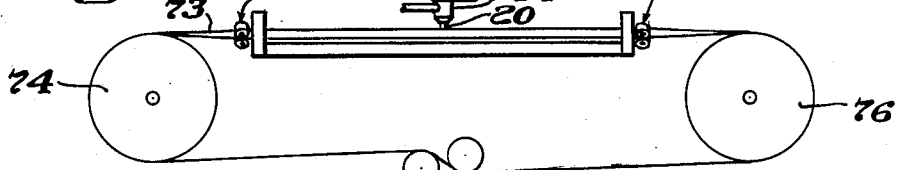
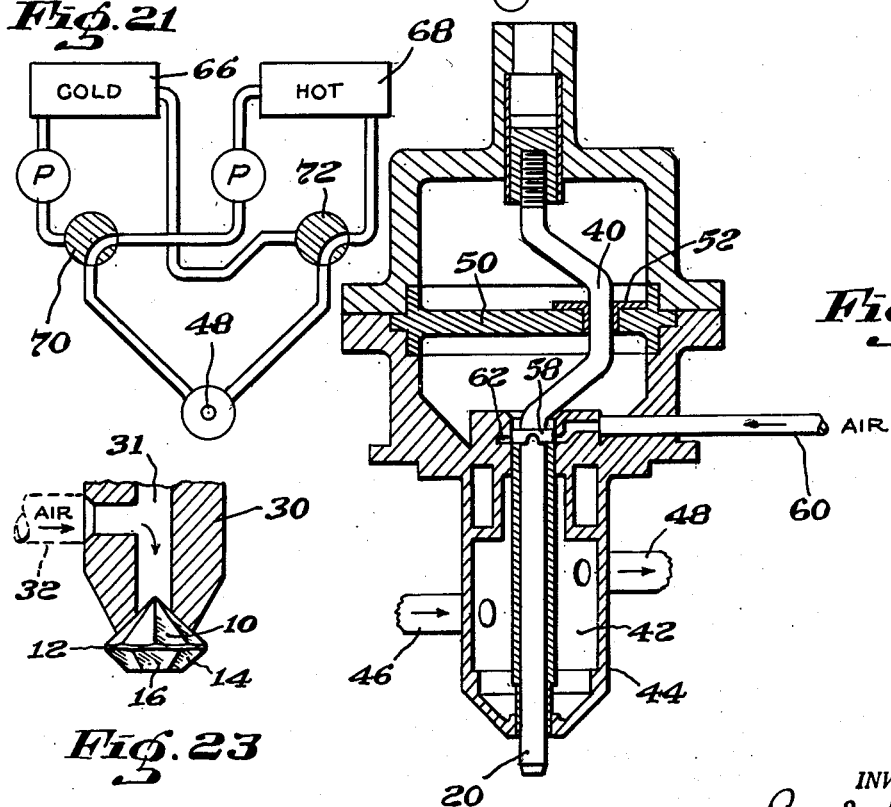
INVENTOR.
Philip W. Dalrymple
BY Rowland V. Patrick
ATTORNEY

Patented June 16, 1953

2,641,879

UNITED STATES PATENT OFFICE 2,641,879

MOUNTING METHOD

Philip W. Dalrymple, Wellesley Farms, Mass., assignor to The International Glass Company, Inc., New York, N. Y., a corporation of New York Application July 11, 1951, Serial No. 236,226

11 Claims. (Cl. 51—229)

This invention is concerned with a method for temporarily mounting work pieces, particularly of minute dimension, and hence, difficultly manageable, for application of treatments requiring exposure of at least some of the surfaces of the work. The invention is particularly useful in connection with the grinding and polishing or buffing of materials such as glass, plastics and/or metal in the manufacture of ornamental and industrial jewels, imitation stones, lens, beads, bearings, buttons and the like.

Imitation stones, rhinestones, for example, are formed from glass which is first shaped into suitable blanks on which facets are ground by abrading wheels. A common form of rhinestone—chatons, for example—may have eight facets on the crown side and eight facets on the pavilion side of the girdle, which, taken with the table on the crown, necessitates the separate treatment of seventeen surfaces. Other faceted rhinestones have an even greater number of facet-forming surfaces requiring treatment. Since the brilliance of the polished stone is dependent to a large degree upon geometrically accurate dimensions, precision in the manufacturing operation is of importance; yet many of the stones are extremely minute in size, for example, those falling within the commercially known range of 1–15 Stone Size (S. S.). When, to extremely small size, is added the necessity of grinding both the pavilion and the crown sides, requiring the exposure first of the bottom and then of the top of the blank to the abrasive, the matter of properly handling and holding the work looms as a large factor in production costs. The best that the art has done so far is to use a readily meltable metal, a cement, an adhesive, plaster of Paris or a pitch for attaching the work to a holder, for example, a dopstick, the cement or other material being heated to soften it, the stone being placed thereagainst and then the cement allowed to harden. After one set of facets has been ground, the stone is released from the dopstick and re-set with further cement in position to expose its previously concealed surfaces. Lack of holding power or inaccurate setting causes rejects, while the considerable length of time involved in setting up and releasing the work all adds to production costs.

It is the main object of this invention to provide an improved manner for temporarily mounting such materials and the like for handling during manufacture. In accordance with this invention, a stone or other work piece may be accurately temporarily mounted in a dopstick or other suitable work holder more quickly and may be released more quickly than heretofore; and it may be very quickly transferred from one dopstick to another, to expose new surfaces, with or without intervening manual or mechanical handling. Moreover, the used dopsticks may be reconditioned for re-use with only a simple cleaning operation. Usually an air blast cleaning suffices.

Work to be treated is bonded in accordance with this invention to a work support with a low temperature bond induced by interposing a film of a material which is liquid at normal room temperatures, preferably water, between the work piece and work support and freezing the liquid into an ice bond, if it be water, which is maintained during manufacturing operations performed on remaining exposed surfaces of the work. The work is quickly released merely by melting the ice bond by application of heat.

The freezing of the bond may be performed in a matter of seconds by maintaining the work support, normally formed of metal or other material having good heat conductivity, at a temperature below the freezing point of the water or other liquid, the lower the temperature, the faster the freezing and, at least to a finite low temperature, the firmer the bond. The temperature of the work-receiving surface of the support may then be temporarily raised by the application of heat, localized, if desired, while the work is brought into contact with a film of water or other liquid which is in contact with the temporarily warmed work-receiving surface; and a similar expedient may be used to melt the ice to release the bond and permit removal of the work. Since only moisture is left on the dopstick, no extensive cleaning operation is required to ready the surface to receive its next piece of work.

A dopstick or other work support may be maintained at a low temperature by fashioning the dopstick from a material of good heat conductivity, such as copper in rod or tubular form, and surrounding the rod except near its work-receiving extremity with a housing containing a chamber designed for the closed circulation of a refrigerant, the chamber being in heat exchange relation with the dopstick. The same or a different chamber may be utilized for circulating a hot temperature-raising fluid, but, for more efficient operation, I prefer localized application of radiant or high frequency induced heat at the bonding surface, thus obviating interchange of chamber circulation with its attendant slower operation.

A particular advantage of the invention is its adaptability to making automatic dopstick-to-dopstick transfers, whereby, for example, in the case of a faceted stone, when the manufacturing operations creating and finishing the pavilion facets are completed, the stone may be automatically transferred to a second dopstick for exposing the previously concealed crown facet and table surfaces.

In order to permit a plurality of angled surfaces to be cut without breaking the bond, the dopstick is desirably mounted for rotation relative to the heat exchanger and, in this event, with the use of refrigerant, certain precautions are taken against inadvertent formation of a bond of frozen condensed moisture between the bearing surfaces of the rotatable dopstick. Constant flow of air or other gas along these bearing surfaces has been found to be a complete safeguard against such eventuality.

A further feature of the invention comprises a dopstick arrangement which has means for breaking the residual capillary action of the liquid bonding material after the ice has been melted so that, if desired, the work may be automatically ejected from the dopstick when release is desired.

While the invention may be applied to the manufacture of a variety of forms of work-pieces, including in the ornamental jewelry art, dentelles (which may have sixteen instead of eight facets on both the pavilion and crown), baguettes, octagons, squares, or to shapes involving curved, as distinguished from flat surfaces, such as navettes, pears, and ovals, for the purposes of a specific description of the invention, operations as applied to a chaton have been illustrated in the accompanying drawings, wherein:

Fig. 1 is a top plan view of a double prismatic blank, as a glass, to be subjected to facet- and table-finishing operations;

Fig. 2 is a side elevation of such a blank;

Fig. 3 is a top plan view of a fragment of a supporting plate provided with a hole adapted to receive and properly locate such a blank;

Fig. 4 is a section indicated by line 4—4 in Fig. 3;

Fig. 5 is a vertical section of the work-receiving portion of a dopstick, a spray nozzle, and a work-supporting plate loaded with a blank about to be presented to the dopstick;

Fig. 6 is a vertical section predicated upon Fig. 5 but omitting the spray nozzle and representing the plate as presenting the blank to the dopstick;

Fig. 7 is a vertical section in which the blank, frozen to the dopstick, is held in contact with an abrading surface in the form of an endless belt;

Fig. 8 is a top plan view, partly in section, of an indexing device for presenting a plurality of surfaces of a held blank successively at a work station;

Fig. 9 is an elevation of a dopstick on a scale the same as that of Figs. 8, 10, 11 and 12;

Figs. 10, 11 and 12 represent a portion of a dopstick and an attached work-piece presented to successive abrading surfaces in the form of belts, wheels, discs or stones of different grades;

Fig. 13 represents portions of two dopsticks cooperatively related to provide for transferring a work-piece from one to the other;

Figs. 14, 15 and 16 represent a portion of a dopstick and an attached work-piece, the table of which is being presented to successive abrading surfaces of different grades;

Figs. 17, 18 and 19 represent a dopstick and work-piece assemblage similar to that in Figs. 14, 15 and 16, but illustrating the abrading surface set for operation on the crown facets of the work-piece;

Fig. 20 represents an elevation of an abrading device in the form of a belt mounted on pulleys, a dopstick assemblage, and adjustable guides by which the face of the belt may be tilted to secure the desired grinding angle;

Fig. 21 is a diagram that represents two fluid circuits adapted to be used alternately, one to heat and the other to chill the work-holding portion of a dopstick;

Fig. 22 represents a sectional view of a dopstick assemblage including a fluid jacket for thermal regulation; and Fig. 23 represents in sectional detail a stage of operation for releasing a finished work-piece from a dopstick.

The finished stone of Fig. 23 has a pavilion 10, a girdle 12, a crown 14 and a table 16, formed by the finishing, on a prismatic blank of the type shown in Figs. 1 and 2, of eight facets on each of the pavilion and crown and of the table 16 across the top of the crown. While the blank of Figs. 1 and 2 is shown as a rough molded prismatic blank, it is within the contemplation of this invention that the blank may have conical or other shape, so that the facet surfaces are thereafter formed, rather than being merely finished.

One form of suitable work-holder is shown as comprising a chromium-plated copper work-holder 20, shown as solid, but it may be hollow, recessed at its end to provide a generally conical setting or work-receiving surface for the work. The end portion of the dopstick may be either integral with the remainder of the dopstick or may be a detachable replaceable head interchangeable with other heads for accommodating a variety of sizes and/or shapes of work-piece. Such a dopstick can be brought to a position to pick up, in properly oriented relation with respect to an indexing device on the dopstick, a stone from a temporary apertured support 22 such as that fragmentarily shown in Figs. 3 and 4. Just prior to the dopstick contacting the stone, its work-receiving surface 24 is supplied with a thin film of water as from a spray nozzle 26 or in other suitable manner. The dopstick is then brought into contact with the stone and, while maintained in this position, the water is frozen. All operations of a kind (as coarse grind, for instance) might be done before going on to the next grade of abrasive.

The stone may be then released from the dopstick by destroying the ice bond and coincidentally, it preferably is transferred to another dopstick 30 as shown in Fig. 13. For performing such a transfer, the dopsticks are brought to end-to-end relation and while in this position, with the stone therebetween, the bond is released from the first dopstick after, while, or even before a bond is created between the stone and the second dopstick, the second dopstick having been previously supplied with a water film from the same or a different spray nozzle, such as that shown in Fig. 5.

The second dopstick 30 is then carried to present the then exposed crown surfaces of the stone to a second series of operations illustrated in Figs. 14 to 19, including the formation and polishing of the eight crown facets and the crown table. Thereafter the completely formed stone is released from the second dopstick. The second dopstick 30 is shown (Figs. 13 and 23) as having an internal conduit 31 through which a fluid such as air may be forced under pressure as from nozzle 32 (Fig. 23) to break the capillary action of the water film remaining after the ice has been melted.

Experience with ice bonds shows that clean surfaces aid in assuring good bonds. While distilled water can be used, good results are obtained with ordinary water containing the usual impurities. Certain wetting agents may be included in the water, though they have a tendency to cause the bond to be of larger area than necessary. In general, the lower the temperature of the cooling, at least down to −60° F., the stronger and quicker the bond, but it will be seen that the lower the temperature, the longer the releasing time. A judicial balance should, therefore, be observed in the regulation of temperature so that it will be sufficient, with a safety factor to provide an adequate holding power without unduly increasing the time required for release.

The particular temperatures utilized must also be chosen with due regard to the character of the work and the operation—it being of critical importance that the work-receiving surface of the support be maintained at a sufficiently low temperature to preserve the bond throughout the manufacturing operation.

While water or any aqueous vehicle is the most inexpensive and satisfactory bonding material for use in my invention, I do not exclude the use of other materials, liquid at normal room temperatures and having freezing points at or above about 32° F., for example, acetic acid, benzol, glycerine, and some of the relatively high freezing point oils.

In other figures of the drawings, I have shown further features of a dopstick assembly useful in mechanizing the operations.

Fig. 9 illustrates an upper dopstick configuration incorporating an offset portion 40 useful as a crank to rotate the dopstick when it is journalled in an assembly such as that shown in Fig. 22. Here, the heat exchanger comprises a closed chamber 42 formed within a housing 44 surrounding the lower portion of the dopstick and having an inlet 46 and an outlet 48 for the ingress and egress of a liquid refrigerant.

The offset portion 40 of the dopstick passes through an indexing disc 50 which has a split ring bushing 52 through which the dopstick extends, the indexing disc being provided with a series, shown as eight in number, of equispaced slots 54 and a stationary spring-pressed key 56, as shown in Fig. 8.

A small thrust bearing 58 is provided on dopstick 20 and the dopstick may, if desired, be spring-pressed at the top. The bearing 58 is radially channelled at 59 so that air introduced through an air channel 60 and annular groove 62 may reach the cylindrical surface of the rod 20 below the bearing and flow downwardly between the rod and the rod-receiving bearing surface of the housing 44 to prevent accumulation of condensed moisture which might freeze and bind the dopstick against rotation.

Fig. 21 illustrates one form of temperature control system including a source of refrigerant 66 and a source of heat 68 (steam or hot water), the two sources being connected in parallel through two-way valves 70 and 72 to the inlet 46 and outlet 48 of the dopstick assembly. Pumps P are introduced in each of the parallel lines to induce a forced circulation.

Other means may, however, be provided for temporarily supplying heat to the work-receiving portion of the dopstick such as the high frequency coil illustrated in Fig. 13, into the central opening of which the dopstick may be passed.

In Fig. 20 I have shown a dopstick assembly such as that previously described and shown in Fig. 22 presented to an abrasive belt 73 running between two pulleys 74 and 76 and twisted into an angled working run by roller guides 78. Preferably, the working run is over a stationary support plate 82 shown in Fig. 7, which may have a spring-pressed, or otherwise adjustable, platen 84 near the dopstick position and extending through an aperture 85 in the plate 82 to yieldingly present the abrasive surface to the stone.

The dopstick assembly may be slidably mounted on a transverse shaft 79 so that it may be moved into position over the belt and, in that position, its dopstick may be indexed, as previously described. The dopstick assembly is also mounted for rotation about a horizontal axis 80 so that it may be tilted into a horizontal position to effect a transfer, as illustrated in Fig. 13, to another dopstick mounted on the same shaft or on an aligned or parallel shaft.

Since, as indicated in the finished stone of Fig. 23, the pavilion facets are offset from the crown facets, it may be desirable that one or both of the assemblies holding the dopsticks 20 and 30 be provided with means for temporarily indexing the dopstick to a position half-way between its normal indexing position so that in its transfer, the stone will be, in effect, rotated, in the case of an eight-facet stone 22½°. For this purpose, a manually or other operated key 90 may be provided on the dopstick assembly, which can be inserted into one of the indexing recesses 54. The normal indexing finger 56 may then be withdrawn and the disc rotated until the key 90 abuts a surface 91 of the dopstick assembly housing, all as indicated in Fig. 8. After the transfer, the key may then be removed and the indexing finger 56 of the second dopstick may be utilized in the normal manner for the operations in which the second dopstick is involved. Or, the key 90 may be associated with the dopstick assembly of the dopstick 20 so that the dopstick 20 may be given the 22½° rotation prior to the transfer, all depending upon the relative arrangements of the indexing mechanism in the two transferring dopsticks.

While, for purposes of explanation, the practice of the invention has been illustrated and described in its application to a chaton manufacturing operation with equipment appropriate therefor, as hereinbefore indicated, the invention is applicable to a variety of types and shapes of work-pieces with appropriate supports in single or multiple array. Moreover, the mounting of the work-pieces may be for the purpose of any desirable operation, whether abrasive in nature, as shown, or otherwise, the scope of the invention not being limited except as defined in the appended claims.

I claim:

1. The method of temporarily rigidly mounting difficultly manageable work-pieces on supports for application of precision treatments to exposed surfaces of the mounted work-pieces which comprises interposing a material which is liquid at normal room temperature between and in contact with a work-piece and a work-receiving surface of a work-support at a temperature not substantially exceeding normal room temperature, and withdrawing heat from said liquid at least in part by conduction through said support until said liquid is frozen at a temperature below room temperature, and forms a rigid work-piece-to-support frozen bond and thereafter treating an exposed surface of the work-piece while maintaining the temperature of said bond below the freezing point of said material.

2. The method of temporarily rigidly mounting difficultly manageable work-pieces on supports for application of precision treatments to exposed surfaces of the mounted work-pieces which comprises interposing a material which is liquid at normal room temperature between and in contact with a work-piece and a work-receiving surface of the support at a temperature not exceeding normal room temperature, and withdrawing heat from said liquid until said liquid is frozen at a temperature below room temperature and forms a rigid work-piece-to-support frozen bond, treating an exposed surface of the work-piece while maintaining the temperature of said bond below the freezing point of said material and thereafter breaking the bond by applying heat to raise the temperature of the bond to substantially normal room temperature to permit ready removal of the work-piece from the support.

3. The method of temporarily rigidly mounting difficultly manageable work-pieces on supports for application of precision treatments to exposed surfaces of the mounted work-pieces, which comprises interposing a film of water between and in contact with a work-piece and a work-receiving surface of a work-support and then freezing the water to form a rigid work-piece-to-support ice bond, thereafter treating an exposed surface of the work-piece while maintaining the temperature of the bond below 0° C.

4. The method of temporarily rigidly mounting difficultly manageable work-pieces on supports for application of precision treatments to exposed surfaces of the mounted work-pieces, which comprises interposing a film of water between and in contact with a work-piece and a work-receiving surface of a work-support and then freezing the water to form a rigid work-piece-to-support ice bond, thereafter treating an exposed surface of the work-piece while maintaining the temperature of the bond below 0° C. and thereafter breaking the bond by applying heat thereto to melt the ice and permit ready removal of the work-piece from the support.

5. The method of mounting imitation stone blanks on dopsticks for cutting of facets or other surfaces thereon which comprises interposing a film of water between and in contact with the imitation stone blank and the work-receiving surface of the dopstick, freezing the water to form a rigid blank-to-support ice bond, cutting a facet or other surface on the stone while maintaining the temperature of the bond below 0° C., and thereafter breaking the bond by applying heat to melt the ice and permit ready removal of the stone from the dopstick.

6. The method of temporarily rigidly mounting difficultly manageable work-pieces on supports for application of precision treatments to exposed surfaces of the mounted work-pieces which comprises circulating a refrigerant in heat exchanger relation with the support to maintain the temperature of a work-receiving surface of the support normally below room temperature, applying heat locally to said surface to raise its temperature at least momentarily while interposing a material which is liquid at normal room temperature and has a freezing point above the maintained temperature of said surface, between and in contact with a a work-piece and said surface, and then discontinuing the application of said heat to freeze said liquid on said chilled work-receiving surface and form a rigid work-piece-to-support frozen bond and treating the exposed surfaces of the work-piece while maintaining the temperature of said bond below the freezing point of said material.

7. The method of transferring a work-piece from one work-support to another work-support which comprises carrying a work-piece mounted on one support in its mounted position into contact with a second work-support by relative movement between the two supports, while interposing a film of a material liquid at normal room temperature between the work-piece and a work-receiving surface of the second support, freezing the material of said film to form a rigid frozen bond between the work-piece and the second support, releasing the work-piece from the first support and withdrawing the transferred work-piece from the first support by relative withdrawal movement of said supports.

8. The method of transferring a work-piece from one work-support to another work-support which comprises carrying a work-piece mounted on one support in its mounted position into contact with a second work-support by relative movement between the two supports, while interposing a film of water between the work-piece and a work-receiving surface of the second support, freezing the water in said film to form a rigid ice bond between the work-piece and the second support, releasing the work-piece from the first support and withdrawing the transferred work-piece from the first support by relative withdrawal movement of said supports.

9. A work-piece support having a housing in heat exchange relation with a portion of said support, another portion of said support projecting beyond said housing to provide a work-receiving surface, said work-receiving surface being mounted for rotation relative to said housing, said housing defining a chamber external to said rotatable work-receiving surface, inlet and outlets communicating with said chamber for circulating a temperature controlling fluid through said housing and means for flowing a fluid between said housing and the rotatable portion of said work-support to minimize accumulation of condensed moisture therebetween.

10. A work-piece support having a housing defining a chamber in heat exchange relation with a portion of said support, another portion of said support projecting beyond said housing to provide a work-receiving surface, inlet and outlet connections communicating with said chamber for circulating a refrigerating fluid in a closed system through said chamber, means for applying a liquid to the work-receiving surface of said support and a high-frequency coil adapted to receive within its coil said work-receiving surface of said support for applying heat to said surface, whereby liquid applied to said surface may be frozen by said circulating refrigerating fluid and may be reliquefied through application of heat from said high-frequency coil.

11. A work-piece support as claimed in claim 10, wherein the housing surrounds a portion of the work-piece support and the work-piece support, including its work-receiving surface, is mounted for rotation relative to said surrounding housing.

PHILIP W. DALRYMPLE.

References Cited in the file of this patent

UNITED STATES PATENTS

| Number | Name | Date |
|---|---|---|
| 995,537 | Hertner et al. | June 20, 1911 |
| 2,076,502 | Moscini | Apr. 6, 1937 |
| 2,354,296 | Arms | July 25, 1944 |
| 2,582,087 | Turner et al. | Jan. 8, 1952 |